US007260066B2

(12) United States Patent
Wang et al.

(10) Patent No.: US 7,260,066 B2
(45) Date of Patent: Aug. 21, 2007

(54) APPARATUS FOR LINK FAILURE DETECTION ON HIGH AVAILABILITY ETHERNET BACKPLANE

(75) Inventors: Linghsiao Wang, Irvine, CA (US); Rong-Feng Chang, Irvine, CA (US); Eric Lin, Irvine, CA (US); James Ching-Shau Yik, Mission Viejo, CA (US)

(73) Assignee: Conexant Systems, Inc., Red Bank, NJ (US)

( * ) Notice: Subject to any disclaimer, the term of this patent is extended or adjusted under 35 U.S.C. 154(b) by 1043 days.

(21) Appl. No.: 10/326,352

(22) Filed: Dec. 20, 2002

(65) Prior Publication Data

US 2004/0085894 A1 May 6, 2004

Related U.S. Application Data

(63) Continuation-in-part of application No. 10/284,856, filed on Oct. 31, 2002.

(51) Int. Cl.
*G01R 31/08* (2006.01)
(52) U.S. Cl. .................... 370/248; 370/249
(58) Field of Classification Search .............. None
See application file for complete search history.

(56) References Cited

U.S. PATENT DOCUMENTS

| | | | | |
|---|---|---|---|---|
| 5,649,100 | A * | 7/1997 | Ertel et al. ................. 709/225 |
| 6,038,219 | A * | 3/2000 | Mawhinney et al. ........ 370/242 |
| 6,088,328 | A * | 7/2000 | McKnight .................. 370/216 |
| 6,246,666 | B1 | 6/2001 | Purcell et al. |
| 6,285,656 | B1 * | 9/2001 | Chaganty et al. ........... 370/228 |
| 6,298,039 | B1 * | 10/2001 | Buskens et al. ............ 370/216 |
| 6,308,282 | B1 * | 10/2001 | Huang et al. ................. 714/4 |
| 6,381,218 | B1 * | 4/2002 | McIntyre et al. ........... 370/245 |
| 6,546,425 | B1 * | 4/2003 | Hanson et al. .............. 709/227 |
| 6,975,587 | B1 * | 12/2005 | Adamski et al. ............ 370/217 |
| 2002/0004843 | A1 | 1/2002 | Andersson et al. |
| 2003/0012222 | A1 * | 1/2003 | Rinchiuso .................... 370/468 |

FOREIGN PATENT DOCUMENTS

WO WO-00/79711 A1 12/2000
WO WO 02/10930 2/2002

OTHER PUBLICATIONS

PCI Industrial Computer Manufacturers; "CompactPCI Packet Switching Backplane Specification"; Sep. 5, 2001; Sections 1-5.4 and Appendices.
Cisco Systems Inc; "Configuring UDLD"; Online exerpt; URL:http://web.archive.org/web/20021002142321/www.cisco.com/universed/cc/td/doc/product/lan/cat5000/rel_5_2/config/udld.htm; Oct. 1, 1999.

* cited by examiner

*Primary Examiner*—Chau Nguyen
*Assistant Examiner*—Jung Park
(74) *Attorney, Agent, or Firm*—Lawrence E. Laubscher, Jr.

(57) ABSTRACT

A method for actively detecting link failures on a high availability backplane architecture. The backplane system includes redundant node boards operatively communicating with redundant switch fabric boards. Uplink ports of the node boards are logically grouped into trunk ports at one end of the communication link with the switch fabric boards. A probe packet is sent, and a probing timer is set whenever either a specified number of bad packets are received, or an idle timer expires. If a response to the probe packet is received before the probe timer expires then the link is deemed valid, otherwise the link is presumed to have failed. Preferably, either the node boards or the switch fabric boards are configured to properly handle a probe pack, which preferably has identical source and destination addresses.

7 Claims, 7 Drawing Sheets

APPARATUS FOR LINK FAILURE DETECTION ON HIGH AVAILABILITY ETHERNET BACKPLANE

CROSS-REFERENCE TO RELATED APPLICATIONS

This is a continuation-in-part of application Ser. No. 10/284,856 filed Oct. 31, 2002.

BACKGROUND OF THE INVENTION

This invention is related to the field of networking devices, and more particularly to an Ethernet network device having backplane architecture for detecting a link failure and switching to a good port in response thereto.

Any business operating on a 24/7 basis strives cannot afford to suffer from outages for longer than just a couple of minutes or perhaps no more than half an hour. Unplanned outages can severely hamper data operations and, can be extremely expensive in terms of lost revenue and manpower expended to correct such situations. Two recent 1995 studies showed that average businesses lost between $80,000 and $350,000 per hour due to unplanned outages. With these dollar loses in mind, it becomes quickly obvious that setting up a redundant information technology structure comes at a cheaper price than the risk of even a short outage. This is especially true when considering the relatively low prices of computers running versus the cost of such downtime. Furthermore, administrators know exactly how expensive the additional equipment, software and operator education is, whereas the cost of unplanned outages can be very difficult to quantify beforehand.

The Ethernet network has been overwhelming deployed in Local Area Networks (LAN) because of its low cost, easy deployment and installation. After years of improvements on the Ethernet technology, today, the application of Ethernet has been extended from LAN to the both WAN/MAN. More recently, the Ethernet technology is also incorporated into the backplane of chassis-based systems due to the low cost, widely available sources, and embedded error detection capability.

In the chassis-based system, the backplane is required to provide the reliable and robust connections among link cards and modules. However, since the Ethernet network was originally developed in a LAN environment, the "availability" requirement for the LAN application is quite different from the one for the backplane application. For example, in a conventional LAN environment, the spanning tree protocol is used to provide a "failover" function by reconfiguring the active topology when the network detects a link or port failure. However, the convergence time is relative long. From the time of detection of the failure, it can take as long as twenty to fifty seconds to complete the change in topology and resume to normal operation. Even using a conventional "improvement" protocol, the fast spanning tree could take fifty msec (milliseconds) to resume normal operation after detecting the failure in a switch or a link.

According to the Institute of Electrical and Electronics Engineers 802.3 standard, link aggregation has been developed to increase bandwidth and availability by aggregating more than one link together to form a link aggregation group. The media access control layer (MAC) can treat the multiple links as a single logical link. When a link in the aggregating group fails, the traffic can be distributed (or rerouted) over the remanding operating links. However, link aggregation only provides failover among parallel connections, which parallel connections are shared with the same end nodes.

For the backplane application, the Ethernet network usually has very simple configuration, e.g., a star topology, meaning that from every card slot there connects a first bus to a first switch fabric and a second bus to a second switch fabric. If the first bus fails to work, the device switches automatically to use the second bus. However, the convergence time of twenty to fifty seconds in a spanning tree recovery is not acceptable in a backplane environment. Additionally, link aggregation, as indicated hereinabove, only provides failover among parallel connections that are shared by the same end nodes. That is, a backup link is not shared with the same ends of failure link. Thus, link aggregation may not find application to the Ethernet backplane environment.

Therefore, what is needed is a simple, rapid, and robust solution to achieve high availability for the Ethernet backplane environment with link failure detection and failover switching.

SUMMARY OF THE INVENTION

In view of the aforementioned needs, the present invention contemplates a method, computer-readable instructions, apparatus, and system that actively detects link failures.

In one embodiment, the method for determining failure of a communications link comprises, the steps of setting a timer for a predetermined interval; resetting the timer to the predetermined interval whenever a valid packet is received; and sending a probe packet and setting a probe timer when the timer expires. The status of the communication link is changed to a failure mode if the probe timer expires and a valid response to the probe packet has not been received.

In another embodiment, the method for determining failure of a communications link comprises the steps of sending a probe packet and setting a probe timer after a predetermined number of consecutive invalid packets are received, and changing the status of the communication link to a failure mode if the probe timer expires and a valid response to the probe packet has not been received.

In yet another embodiment of the method for determining failure of a communication link, a probe packet is sent upon the occurrence of either an idle timer expiring or a predetermined number of consecutive invalid packets are received. The status of the communication link is changed to a failure mode if the probe timer expires and a valid response to the probe packet has not been received.

The present invention also includes a computer-readable medium of instructions, comprising means for setting a timer for a predetermined interval; means for resetting the timer to the predetermined interval whenever a valid packet is received; means for sending a probe packet and setting a probe timer when the timer expires; and means for changing the status of the communication link to a failure mode when the probe timer expires and a valid response to the probe packet has not been received.

In another embodiment, there is disclosed herein computer-readable medium of instructions, comprising means for sending a probe packet and setting a probe timer after a predetermined number of consecutive invalid packets are received. and means for changing the status of the communication link to a failure mode when the probe timer expires and a valid response to the probe packet has not been received. The computer readable instructions may further comprise means for sending the probe packet and starting the probe timer when an idle timer has expired.

The present invention further contemplates an apparatus for link failure detection on a high availability Ethernet backplane, comprising means for setting a timer for a predetermined interval, means for resetting the timer to the predetermined interval whenever a valid packet is received, means for sending a probe packet and setting a probe timer when the timer expires and means for changing the status of the communication link to a failure mode when the probe timer expires and a valid response to the probe packet has not been received.

In another embodiment, there is contemplated an apparatus for link failure detection on a high availability Ethernet backplane, comprising means for sending a probe packet and setting a probe timer when a predetermined number of errors are received, and means for changing the status of the communication link to a failure mode when the probe timer expires and a valid response to the probe packet has not been received. In addition, means for setting a timer for a predetermined interval may also be used with this embodiment wherein the probe packet is sent and the probe timer is set if the timer expires. The timer would be reset every time a valid packet is received.

The present invention also contemplates a backplane system comprising a plurality of node boards and a plurality of switch fabric boards wherein each node of the plurality of node boards has a single link to each of the plurality of switch fabric boards. At least one of the group consisting of the plurality of node boards and the plurality of switch fabric boards further comprises means for setting a timer for a predetermined interval, means for resetting the timer to the predetermined interval whenever a valid packet is received; means for sending a probe packet and setting a probe timer when the timer expires, and means for changing the status of the communication link to a failure mode when the probe timer expires and a valid response to the probe packet has not been received. The system may further comprise means for sending a probe packet and setting a probe timer after a predetermined number of consecutive invalid packets are received.

Another embodiment of the backplane system comprises a plurality of node boards and a plurality of switch fabric boards wherein each node of the plurality of node boards has a single link to each of the plurality of switch fabric boards, and means for sending a probe packet and setting a probe timer after a predetermined number of consecutive invalid packets are received and means for changing the status of the communication link to a failure mode when the probe timer expires and a valid response to the probe packet has not been received. The means for sending a probe packet and the means for changing the status of the communication link may be coupled to either the node boards, switch fabric boards, or the combination thereof.

In yet another embodiment of the aforementioned backplane systems, the switch fabric boards further comprises a redirect table and when a switch fabric board detects a failed link, the switch fabric board communicates failed link data to the remaining switch fabric boards, causing the other switch fabric boards to update their redirect tables.

In the preferred embodiments, the probe packet is distinguished by having identical source and destination addresses and the receiving side of the probe packet is configured to respond to the probe packet by sending it back to the sender.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The disclosed architecture provides a high availability Ethernet backplane by automatically detecting a link failure and performing "failover" to a backup link. Failover is defined to be the process or mechanism for switching "off" a failed redundant component and switching "on" the working backup component. One aspect of the invention facilitates rapid and simple failover. Additionally, control message exchanges between nodes are minimized to reduce the processing load on the CPU (Central Processing Unit).

Several schemes are available for link failure detection. One scheme includes sending "heart beat" messages at the MAC (media access control) module. Another scheme uses a frame error rate. Either one or both of the detection schemes can be implemented to detect link failures. Once a link failure is detected, the CPU is utilized to perform the failover procedure. In addition to the two aforementioned link failure detection schemes, a more generalized failure detection scheme may be used which does not require special hardware implementation at the receiver side.

When the logic circuits of a node board have detected a failed port, traffic of that node board is failovered (or redirected) to the working ports (assuming that all nodes have at least two ports and each port connects to a switch fabric node). On the switch fabric node, there is a switchover link to connect two switch fabric nodes. When the switch fabric node detects a failed port, the traffic destined to the failed port is switched over to the switchover (or backup) port. Then, the other switch fabric node forwards the failover traffic to its destination device.

Figure 1:
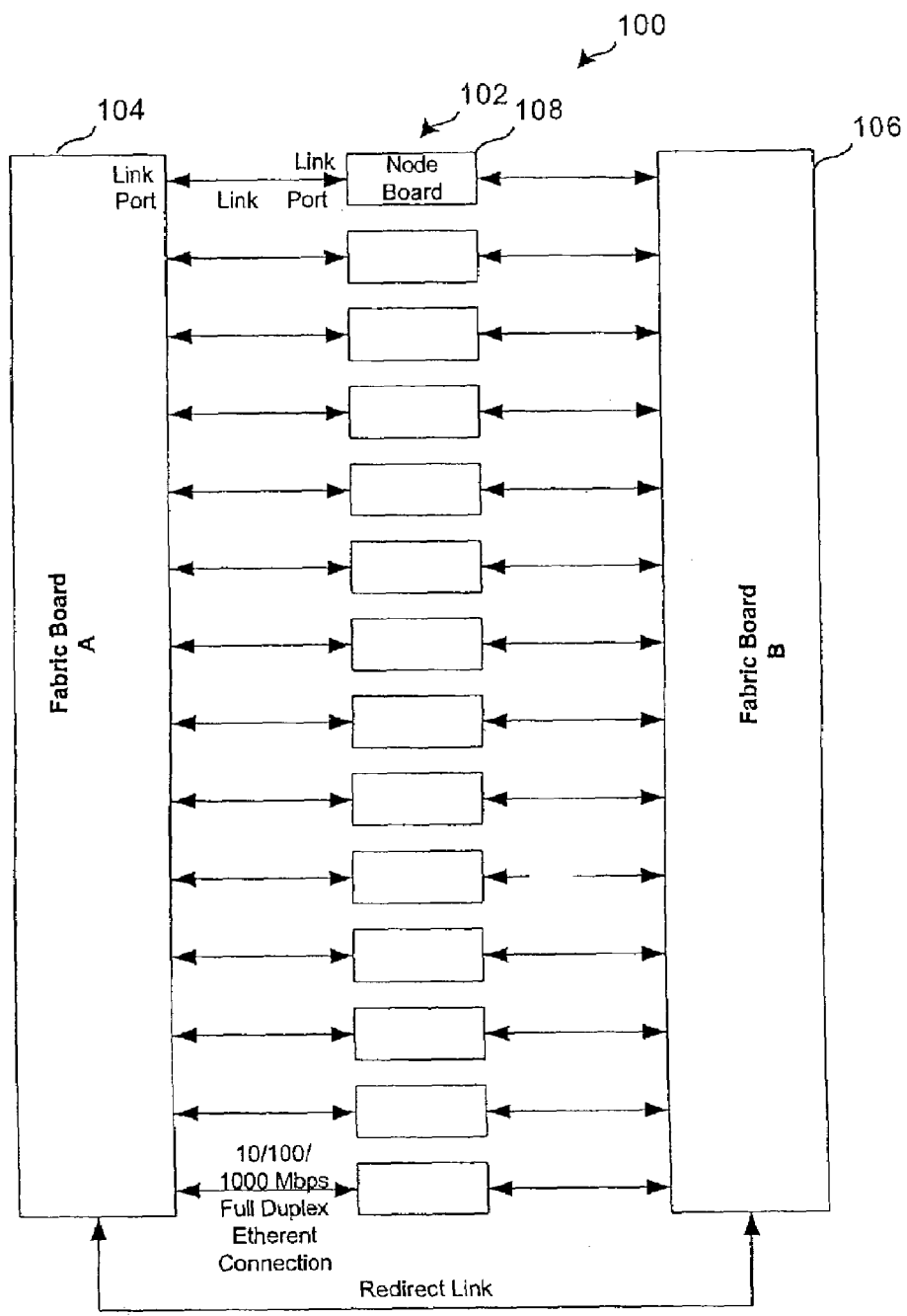
FIG. 1 illustrates a general block diagram of the topology of a dual fabric packet switching backplane.

Referring now to FIG. 1, there is illustrated a general block diagram of the topology of a dual fabric packet switching backplane (PSB) 100. The backplane 100 is used to connect multiple link cards or modules together in the chassis-based system. A typical topology of the backplane 100 is a star topology. Since reliability and availability are the critical design requirements for backplane systems, dual links are usually deployed in a high availability system. For example, the CompactPCI® Packet Switching Backplane specification (also denoted as the PICMG® 2.16 specification), hereby incorporated by reference, defines a packet switching backplane standard of up to twenty-four node boards based upon Ethernet technology, and adopts the star topology.

In this particular embodiment, the PSB 100 consists of fourteen node boards 102, a first switch fabric board (SFB) 104 and a second SFB 106. However, the present invention may be expanded to be used with any number of node boards or fabric boards. Similar to the operation of all of the node boards 102, a node board 108 operatively connects to the first SFB 104 to communicate the transfer of packets therethrough. To increase availability, the second SFB 106 is added in operable connectivity to the node board 108 for the communication of packets therethrough. Each node board 102 has two link ports, one of which connects to the first SFB 104 and the other of which connects to the second SFB 106. The dual fabric PSB system 100 is referred to a dual star topology. The link port is a full duplex Ethernet connection, normally with speeds of be approximately 10/100/1000 Mbps. This link port can be any speed as long as the framing is Ethernet.

The following Table 1 defines the general components of the high availability backplane system 100 of FIG. 1.

TABLE 1

General Components of the High Availability Backplane

| | |
|---|---|
| Node Board | Consists of a subsystem, which can generate and sink packets. |
| Link port | A physical port that is an endpoint of a link, which connects to a node board and a switch fabric board. |
| Link | A physical connection between a node board and a switch fabric board. |
| Fabric Board | A node that consists of multiple link ports and provides switching functions between node boards. |
| Redirect Link | A link that connects two fabric boards, and is used to reroute the failover traffic. |

Figure 2:
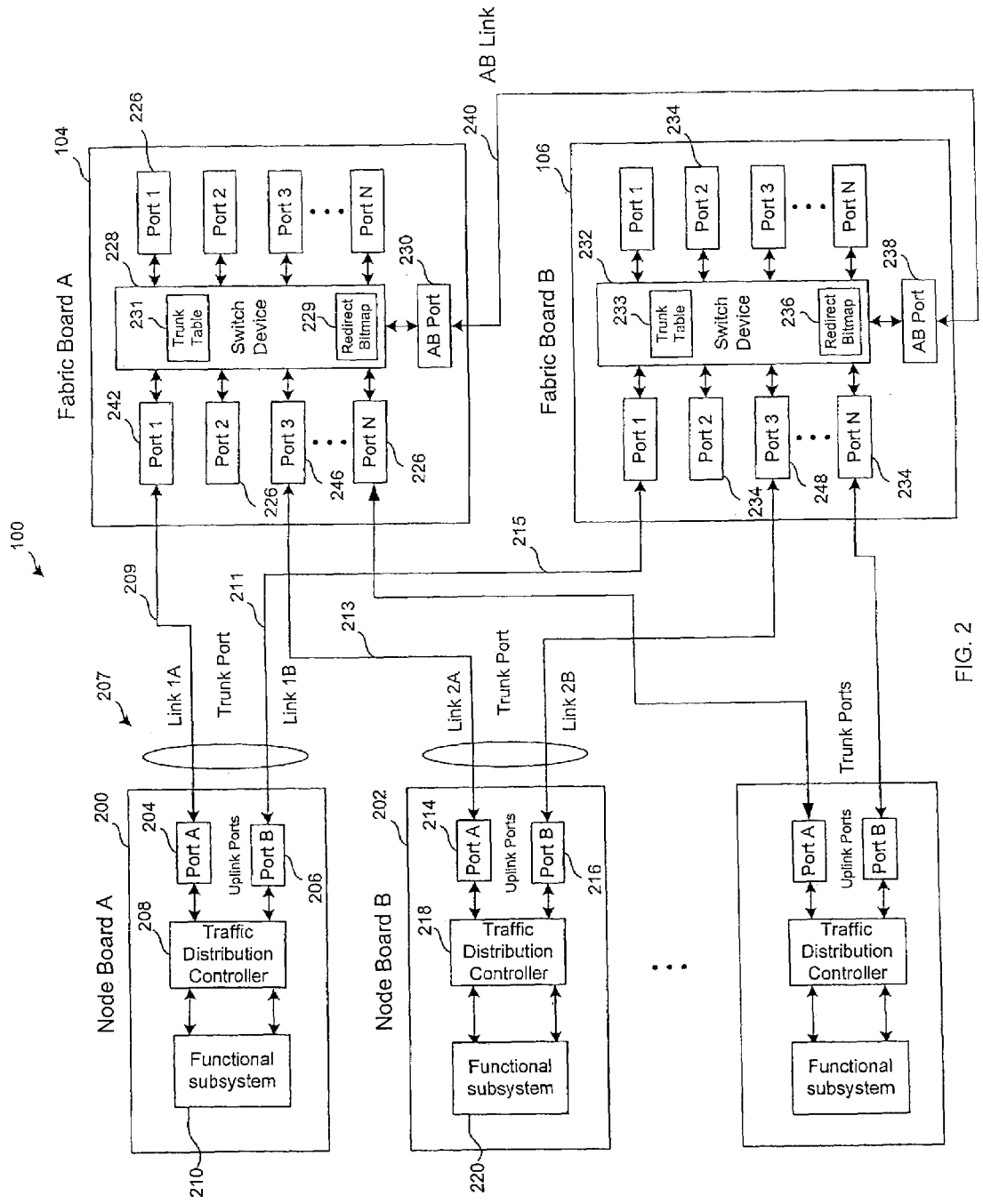
FIG. 2 illustrates a more detailed block diagram of the backplane system, according to as disclosed embodiment.

Referring now to FIG. 2, there is illustrated a more detailed block diagram of the Ethernet backplane system 100, according to one embodiment. A first node board 200 includes two (or redundant) uplink ports (e.g., Ethernet); a first PHY uplink port 204 and a second PHY uplink port 206 each of which provide respective communication connections between the first SFB 104 and to the second SFB 106. The first SFB 104 and the second SFB 106 are thus are connected in parallel with respective to the first node board 200. the node board 200 includes a function executing subsystem 210, a traffic distribution controller 208 and two uplink port interfaces 204, 206. The traffic distribution controller 208 performs buffering and scheduling and then dispatches the traffic from the function executing subsystem 210 to one of the uplink port interfaces 204, 206 based on the algorithm for port trunking.

The PHY uplink ports (204 and 206) of each node board are grouped as a logical port, called a trunk port 207. When a packet is received into the trunk port 207, the backplane system 100 does not distinguish which physical uplink port (204 or 206) should receive the packet. However, when a packet is transmitted out of the trunk port 207 of the first node board 200, the traffic distribution controller 208 determines to which physical uplink port (204 and 206) the packet will be sent, and forwards the packet to that uplink port. The data utilized for selecting the outgoing uplink port (204 or 206) in the trunking port 207 can be based upon the source and/or destination MAC address, or any other combination of packet information. For example, it can be based upon a hash key from the source and destination MAC address.

The CPU utilizes and maintains a trunking table in the traffic distribution controller 208 for determining which of the uplink ports (204 or 206) to use for outgoing packet traffic. The trunking table stores the current mapping information of the trunk port to the physical uplink ports for outgoing packets. The backplane system 100 controls the distribution of packet traffic between the first SFB 104 and second SFB 106 by accessing the mapping information of the trunk table and determining which trunk port and physical uplink port should be used for the packet traffic. This association in the trunk table changes dynamically according to normal mode operations and failover operations.

The system 100 further comprises a second node board 202 includes two uplink ports (e.g., Ethernet): a first uplink port 214 and a second uplink port 216 which provide a communication connection between the first SFB 104 and to the second SFB 106. The first SFB 104 and to the second SFB 106 are thus are connected in parallel with respective to the second node board 202. The second node board 202 also includes a traffic distribution controller 218 (e.g., an Ethernet switching device, in this embodiment) that selects which of the first and second uplink ports (214 and 216) is downlinked to a function executing subsystem 220 of the second node board 202. The first and second uplink ports 214, 216 are redundant systems.

The first and second SFBs (104 and 106) provide the means of communication between the node boards 102 and 202. The first SFB 104 includes, in this particular embodiment, a fabric switch device 224 and multiple PHY port devices 226 (e.g., Ethernet type). The switch device 224 includes a redirect bitmap (also known as an unreachable bitmap) 229 accessed for redirect information for redirecting packets during failover and a trunk table 231 for storing status information of any of a number of trunk ports. The switch device 224 interfaces with the second SFB 106 via an AB PHY port 230. The second SFB 106 includes, in this particular embodiment, a fabric switch device 232 and multiple PHY port devices 234 (e.g., Ethernet type). The fabric switch device 232 also contains a redirect bitmap 236 accessed for redirect information for redirecting packets during failover, and a trunk table 233 for storing the status information of any of a number of trunk ports. The switch device 232 interfaces with the first SFB 104 via an AB PHY Port 238 over an AB Link 240.

In this embodiment, the backplane system 100 connects the first PHY uplink port 204 of the first node board 200 to a PHY port 242 of the first SFB 104 via a first link 209. The second PHY uplink port 206 connects to a PHY port 244 of the second SFB 106 via a second link 211. The first PHY uplink port 214 of the second node board 202 connects to a PHY port 246 of the first SFB 104 via a third link 213, while the second PHY uplink port 216 connects to a PHY port 248 of the second SFB 106 via a fourth link 215.

In one embodiment, node board signals between the node boards 200 and 202 are communicated between the function executing subsystem 210 of the first node board 200 and the function executing subsystem 220 of the second node board 202 through the first SFB 104 via the respective first uplink ports (204 and 214). Similarly, in response to a detected link failure of the first link 209, failover occurs, and the node board signals are communicated between the function executing subsystem 210 of the first node board 200 and function executing subsystem 220 of the second node board 202 through the second SFB 106 via the respective second uplink ports (206 and 216). Once the link failure of the first link 209 has been resolved, operation resumes in normal mode via the first uplink ports (204 and 214).

Link failure detection can be implemented in different levels. For example, IEEE 802.3 specifies a PHY-level detection mechanism for the Ethernet PHY. In the absence of the data traffic, a transmitting PHY device periodically (e.g., every 16±8 msec) sends a simple heartbeat (HB) pulse, called Normal Link Pulse (NLP). If the receiving PHY device does not detect the arrival of either a data packet or NLP within a predefined window (e.g., 50-150 msec), the receiving PHY device will assume the link has failed.

At the system level, a local CPU on the node board or attached to a switching fabric can be utilized to check link integrity by periodically sending the heartbeat packet to a CPU on the other side of the system. However, this method utilizes more processing power and time by the CPU's for message processing to interrogate the link to detect the link failure has occurred. This method also requires additional bandwidth, even when the link is busy. Link recovery by his method tends to be slower because of the long decision path.

In the present invention, link failure detection is implemented at the MAC level Detection at the MAC level in the backplane system 100 is preferable for the following reasons. In the backplane environment, not all implemented PHY devices may be capable of embedding a link failure detection mechanism like the Ethernet PHY device (e.g., LVDS devices cannot utilize such detection techniques). Therefore, a MAC module needs to provide the link failure detection. Moreover, rapid link failure detection in the PHY implementation requires approximately 50-150 msec of processing time, whereas the MAC module can detect the link failure much faster depending on the speed of the port. For a Gigabit port, detection can occur in less than one millisecond, whereas for a 100 Mbps port, detection occurs in milliseconds. Furthermore link detection at the PHY level cannot detect a link failure due to a malfunction of the MAC module. Note, however, that the disclosed MAC-level detection scheme can accommodate the PHY link failure detection scheme where such a PHY scheme is implemented.

In discussing a failover operation, it is assumed in this particular embodiment that the backplane control logic controls the routing of a packet from the first node board 200 through the first PHY uplink port 204, across the first link 209, into the fabric port 242, switched through the fabric switch 228 for output of the fabric port 246, across the third link 213, into the first uplink port 214 of the second node board 202, and switched by the switch device 218 into the first subsystem 220 of the second node board 202. Thus when the first node board 200 detects the failure of the first link 209, the backplane control logic initiates failover of the packet traffic from the first PHY uplink port 204 to the second uplink port 206 though the second SFB 106. This is accomplished by changing the trunking table, and forcing all the packet traffic of trunk port 207 originally using the now failed first uplink port 204, to use only the second uplink port 206.

Initially, the first link 209 interconnecting the first uplink port 204 of the first node board 200 (of FIG. 2) is assumed to have failed. When the first SFB 104 detects the failure of the first link 209, all packet traffic from the first uplink port 204 is then redirected for forwarding to the redirect link 240. Then, the second SFB 106 receives the packets (or frames) from the redirect port 238 and forwards the packets to the first SFB 104 via the second link 213.

In operation, the node board utilizes port trunking to perform failover. As indicated hereinabove, the uplink ports of a node board are grouped into a logical trunk port. When a packet arrives from the functional subsystem 210, the traffic distribution controller 208 will first search the destination MAC address of the packet in the local MAC address table. The MAC table shows the association of the MAC address and the destination port can be one of the uplink port or logical trunk port. In the case that the MAC is associated to one uplink port, either 204 or 206, the traffic will always be forwarded to that particular port and the failover will not apply to this particular traffic. If the destination is to the uplink trunk, the traffic distribution controller 208 will execute the trunking distribution algorithm to dispatch the packet to one of the uplink ports 204 or 206.

Selection of the physical port can be based upon the hash key, which is generated by hashing the source MAC and/or the destination MAC addresses.

| MAC table at the first Node Board | | | |
|---|---|---|---|
| MAC Address | Control information | Status | Port/trunk port |
| MAC_b | .... | | Trunk port 1 |
| .... | | | |

| Trunk port table for Trunk port 1 at the first Node Board | |
|---|---|
| Hash Key | Physical Port |
| 0 | Port 1a |
| 1 | Port 1b |
| 2 | Port 1a |
| 3 | Port 1b |

The CPU of the first node board 200 controls the load distribution of packet traffic among the uplink ports (204 and 206) in the trunk port 207 by appropriately assigning the physical ports "ON" in the trunk table.

When the CPU of the node board 200 is informed of a link failure of, e.g., link 209, of the trunk port 207, the CPU changes the status of all of the first uplink ports (204 and 214, also denoted as Ports 1*a* in the trunk table) and second uplink ports (206 and 216) for the two redundant node boards (200 and 202) in the trunk table. Therefore, all packet traffic using the trunk port 207 will now be forced to use the second uplink ports (206 and 216, also denoted as Ports 1*b* in the trunk table). Failover is then achieved.

When the fabric node 104 detects a link failure of any of its ports, the CPU of the fabric board is notified and initiates the failover procedure. The fabric board propagates failure to inform the other fabric board nodes. For example, the CPU of the first SFB 104 signals the second SFB 106 of the node board that connects to the failed link (i.e., now an unreachable node). There exists an redirect bitmap 229 in the first SFB 104 that indicates which port cannot be reached by the other fabric node. When the link failure notice is received, the CPU updates the redirect bit map 229 and sends back an ACK. The redirect bitmap 229 works as a forwarding domain for traffic received from the redirect link so that the node boards with both uplinks working will not receive two copies of a broadcast packet.

Packets received by the redirect link can only be forwarded to the port connected to the node, as indicated in the redirect node bitmap. By providing the redirect bitmap, a node can be prevented from receiving a duplicate broadcast packet. If the redirect bitmap is not provided, a broadcast packet is forwarded to all the ports, including the redirect port. The second SFB 106 will also broadcast the packet. Consequently, all the nodes, except one uplink port of the source node board 204, will receive two copies of packets, one copy form each fabric board. By utilizing the redirect bitmap, the second SFB 106 only forwards packets to the unreachable nodes of the first SFB 104, without sending to other nodes that receive packets from the first SFB 104.

Since the traffic from the node with the failed link will be redirected to the working link, the switch fabric board with the failed link will no longer see the source MAC address associated with the failed port. Thus, the MAC entry on that node board will be aged out eventually. Consequently, the packet with the destination to A will be flooded. therefore, the CPU of the switch fabric board that received the link failure notice shall set the status to 'static' for all MAC entries associated with the failed link port. The table entries with the 'static' status will not be aged out.

After the first SFB 104 receives acknowledgement (ACK) of the Link Failure message from the second SFB 106, the CPU of the first SFB 104 starts to failover to the redirection port packets destined to the failed port by remapping the failed port to redirection port.

On the transmit side, a transmission MAC module periodically sends out a MAC heartbeat message when no packets are currently being transmitted. The duration of the heartbeat message is configurable. In the current implementation, the unit of the period is a time slot, 512-bit transmission time, i.e., 51.2 usec for 10 Mbps and 5.12 usec 100 Mbps. If the link is actively sending regular packet traffic, the link heartbeat message packet will not be transmitted, allowing optimum bandwidth to the link when the link is busy. This is one advantage over the link failure detection done by CPU like spanning tree method.

Note that the PHY devices utilized for the uplink ports and the switching fabric board are not restricted to Ethernet devices, but can be other conventional backplane PHY devices such as LVDS (Low Voltage Differential Signaling). (LVDS is a low-power, low-noise differential technology for high-speed transmission.)

Figure 3:
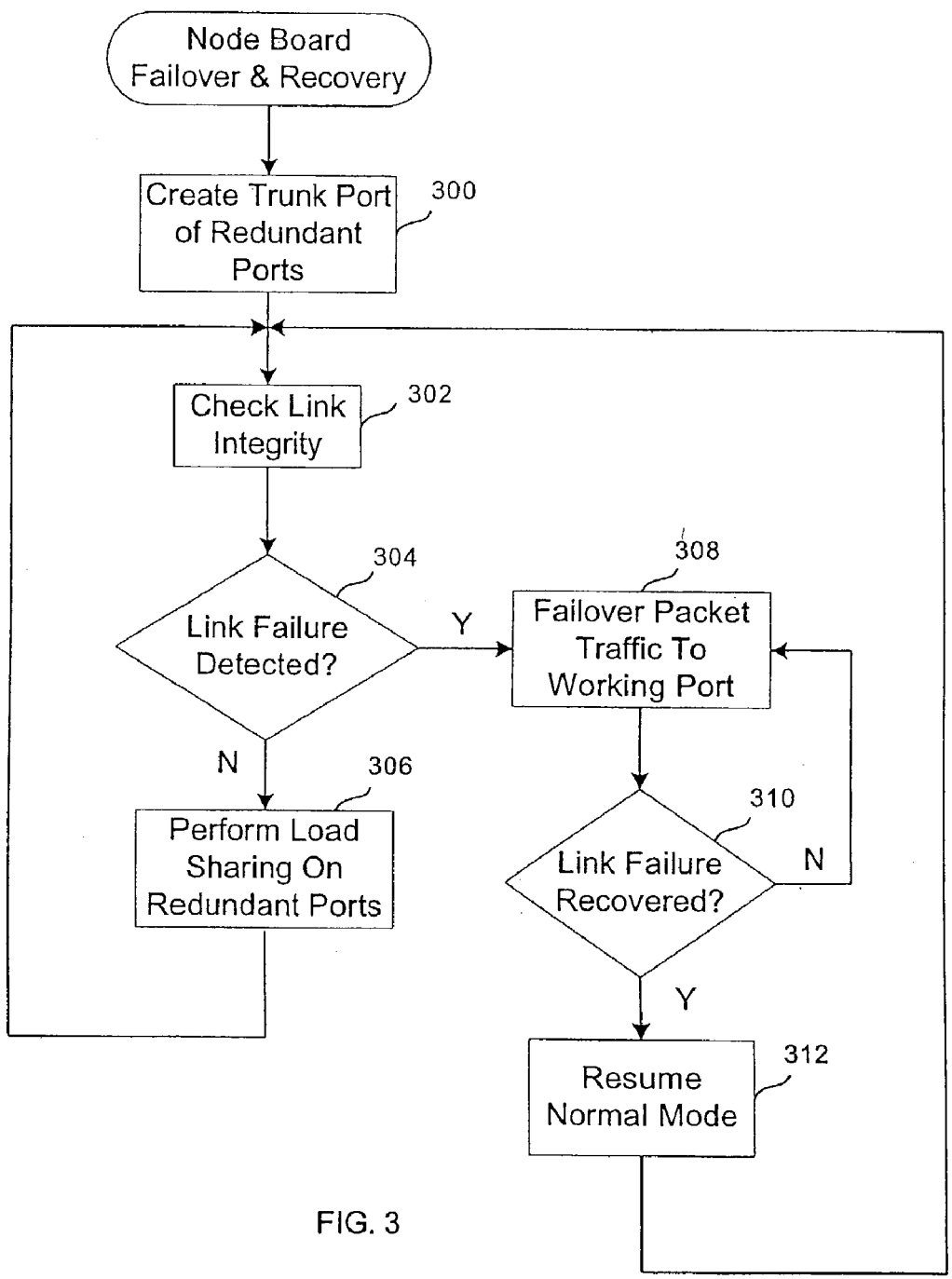
FIG. 3 illustrates a flow chart of the failover process of a node board, according to a disclosed embodiment.

Referring now to FIG. 3, there is illustrated a flowchart of the failover process of a node board, according to one embodiment. When a device detects a link failure, it immediately enters the failover mode and redirects the traffic on the failed link to a working link. Flow begins at a function block 300 where a trunk port is created of redundant PHY uplink ports. In a function block 302, link integrity check is initiated for all ports. Flow is to a decision block 304 where, if a link failure is not detected, flow is out the "N" path back to the input of function block 302 to perform the next link integrity check. On the other hand, if a link failure is detected, flow is out the "Y" path of decision block 304 to a function block 308 to failover the packet traffic to a working port. Flow is then to a decision block 310 to determine if the failover condition had been resolved. If not, flow is out the "N" path to function block 308 to continue failover of the packet traffic. If so, flow is out the "Y" path of decision block 310 to function block 312 to resume normal mode. Flow is then back to function block 302 to perform the next integrity check.

Figure 4:
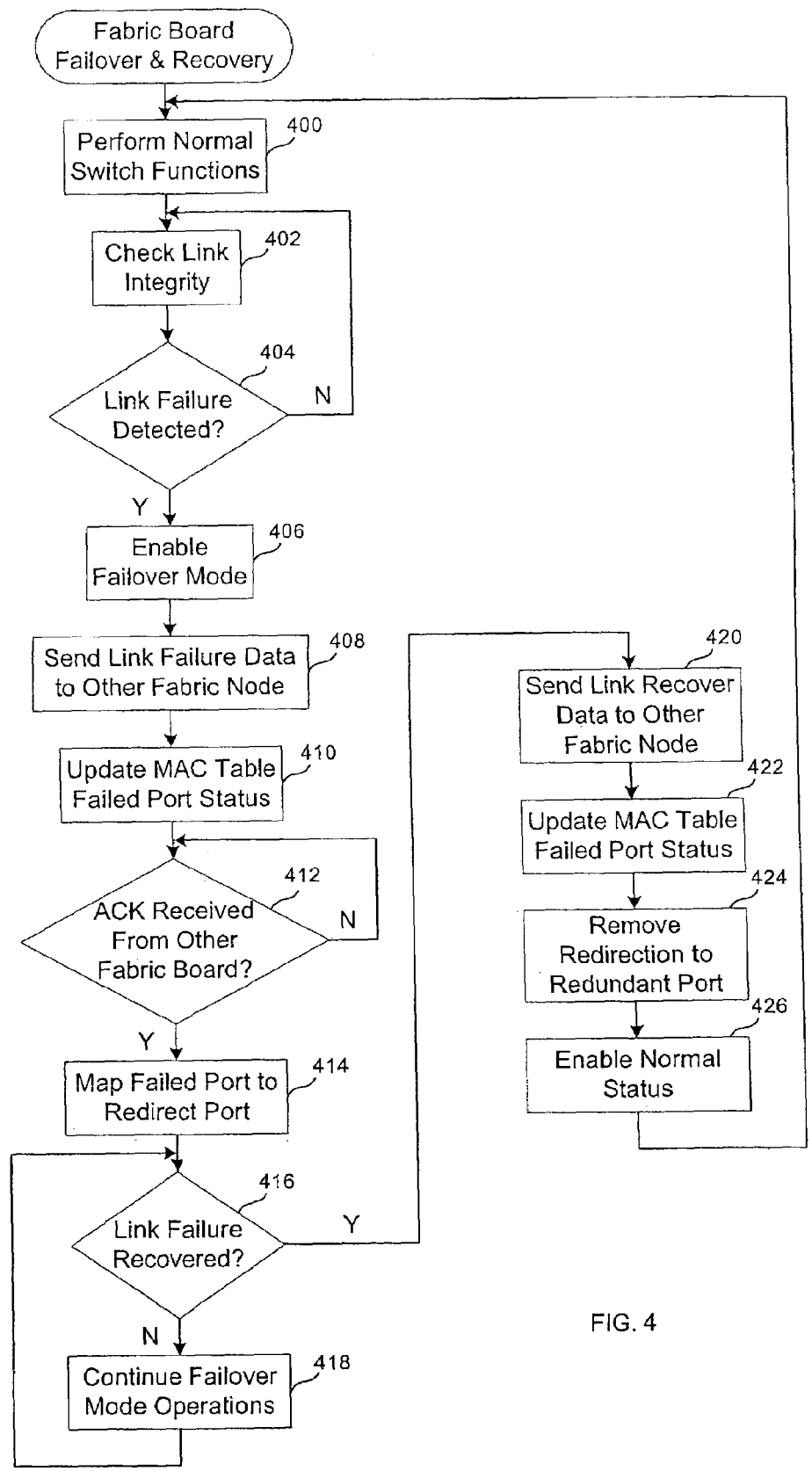
FIG. 4 illustrates a flow chart of the failover process of a fabric board, according to a disclosed embodiment.

Referring now to FIG. 4, there is illustrated a flow chart of the failover process of a fabric board, according to another embodiment. Flow begins at a function block 400 where the backplane system 100 is performing normal functions in normal mode. In a function block 402, a link integrity check is performed. In a decision block 404, if a link failure is not detected, flow is out the "N" path back to the input of function block 402 to perform the next link integrity check. If a link failure is detected, flow is out the "Y" path of decision block 404 to a function block 406 to enable failover mode. In failover mode, link failure data is transmitted to other fabric boards, as indicated in a function block 408. A MAC table is then updated with the failed port status information, as indicated in a function block 410. Flow is then to a decision block 412 to determine if an acknowledgement (ACK) signal has been received from the other fabric boards. If not, flow is out the "N" path to continue checking for receipt of the ACK signal. If the ACK signal has been received, flow is out the "Y" path of decision block 412 to a function block 414 to map the failed port to a redirect port, based upon redirect information contained in the redirect bitmap. Packet traffic is then redirected accordingly until failover is resolved. In a decision block 416, a check is made to determine if failover has been resolved. If not, flow is out the "N" path to a function block 418 to continue operating in failover mode. Flow then loops back to the input of decision block 416 to perform the next failover recovery check. If link recovery has occurred, flow is out the "Y" path of decision block 416 to a function block 420 where link recovery data is forwarded to the other fabric board. The MAC table is then updated accordingly to reflect the link recovery, as indicated in a function block 422. The redirect bitmap is then updated to remove the redirection information to the redundant port, as indicated in a function block 424. The backplane system 100 then resumes normal operating mode, as indicated in a function block 426. Flow then loops back to function block 400 to begin performing normal operation switch functions.

Figure 5:
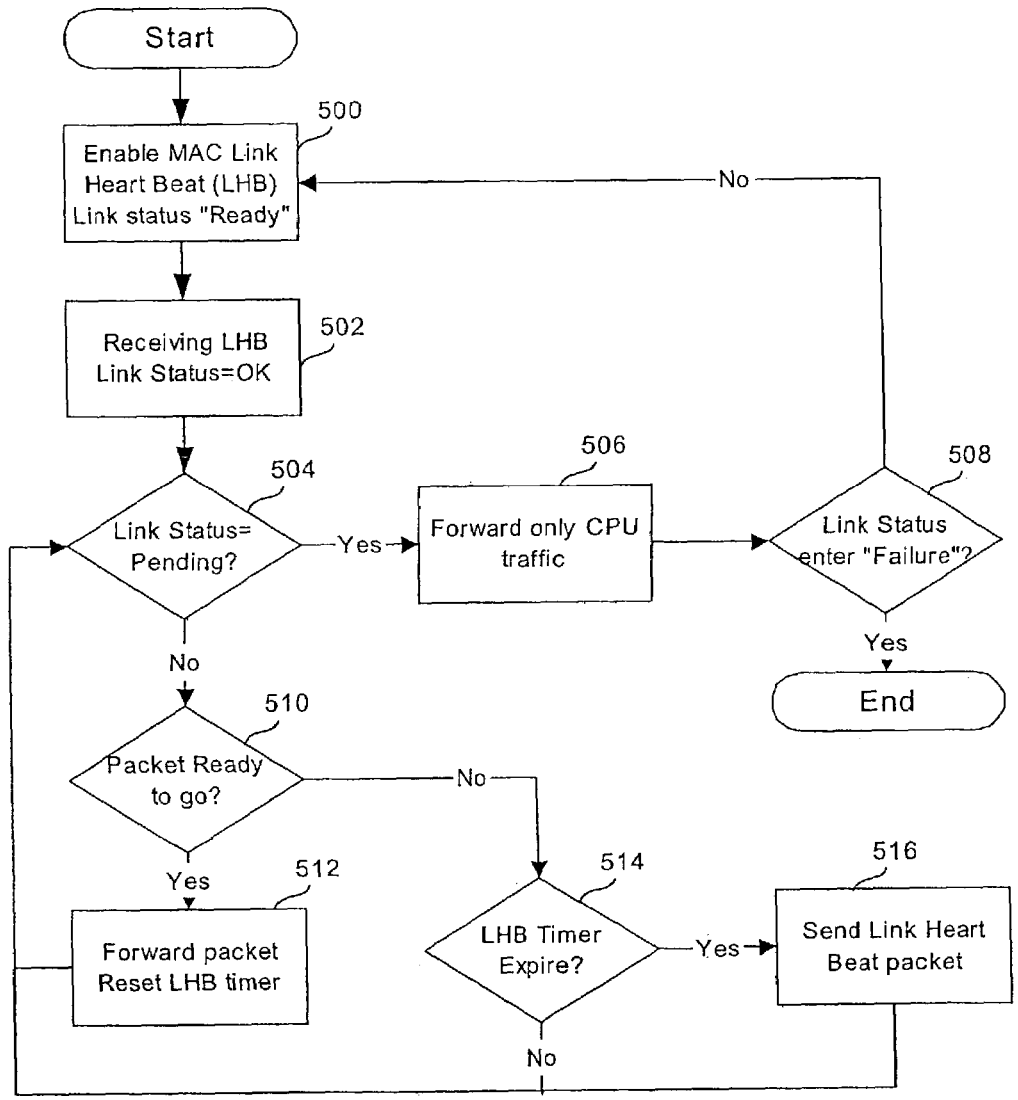
FIG. 5 illustrates a state diagram of the heartbeat signal from the sending side.

Referring now to FIG. 5, there is illustrated a state diagram of the heartbeat signal from the sending side. Flow begins at a function block 500 where the MAC link heartbeat (LHB) signaling is enabled, and the status is designated as "Ready". If a LHB signal has been received, then the status is designated as "OK", as indicated in a function block 502. In a decision block 504, it is determined if the link status is "Pending". If so, flow is out the "Y" path to a function block 506 to forward only CPU packet traffic. In a decision block 508, a check for link failure is made. If no link failure is determined, flow is out the "Y" path to the function block 500 to continue enabling the MAC LHB signal.

On the other hand, if a link failure has been detected, flow is out the "N" path of decision block 508 to an End Terminal.

If a link status check is not pending, flow is out the "N" path of decision block 504 to a decision block 510 to determine if a packet is ready for transmission. If so, flow is out the "Y" path to a function block 512 to forward the packet, and reset the LHB timer. Flow then loops back from function block 512 to decision block 504 to determine again if the system is in a pending state for a link status update. If a packet is not ready for transmission, flow is out the "N" path of decision block 510 to a decision block 514 to determine if the LHB timer has expired. If not, flow is out the "N" path back to the function block 504 to check on the link status. If the LHB timer has expired, flow is out the "Y" path of decision block 514 to a function block 51 to send one or more LHB packets. Flow is then back to the function block 504 to again check on the link status.

Following is a format of the 64-byte link heartbeat (HB) message (values in Hex).

| Dest_MAC_address(6) | SRC_MAC_address(6) | Ethertype(2) | Opcode (2) | Pad (44) | CRC(4) |
| --- | --- | --- | --- | --- | --- |

-continued

| 01-80-C2-00-00-01 | Port MAC Address | 88-08 | 00-02 | Pad 44 "00" | CRC-32 |

As indicated, the Destination MAC Address field is a 6-byte value, and is 01-80-C2-00-00-01. The address of the Flow Control Message for IEEE Std. 802.3x Full Duplex PAUSE operation is shared. The port MAC address field is used as the Source MAC address, which is six bytes. The Ethertype field is two bytes, and is 88-08, which indicates the MAC control format. The 2-byte Opcode value is a value that can be programmable (e.g., a value of 00-02), except the value "00-01", which has been defined as the flow control frame in IEEE 802.3x. Both the transmitting and the receiving ends must use the same Opcode value. The 44-byte Pad field adds forty-four bytes of zeros "00" to meet the 64-byte minimum length of the Ethernet frame.

The HB control message format.

| 0 | 1 | 2 | 3 | 4 | 5 | 6 | 7 |
|---|---|---|---|---|---|---|---|
| 01 | 80 | C2 | 00 | 00 | 01 | 00 | 00 |
| 00 | 00 | 00 | 00 | 88 | 08 | 00 | 02 |
| 00 | 00 | 00 | 00 | 00 | 00 | 00 | 00 |
| . . . | | | | | | | CRC32 |

Figure 6:
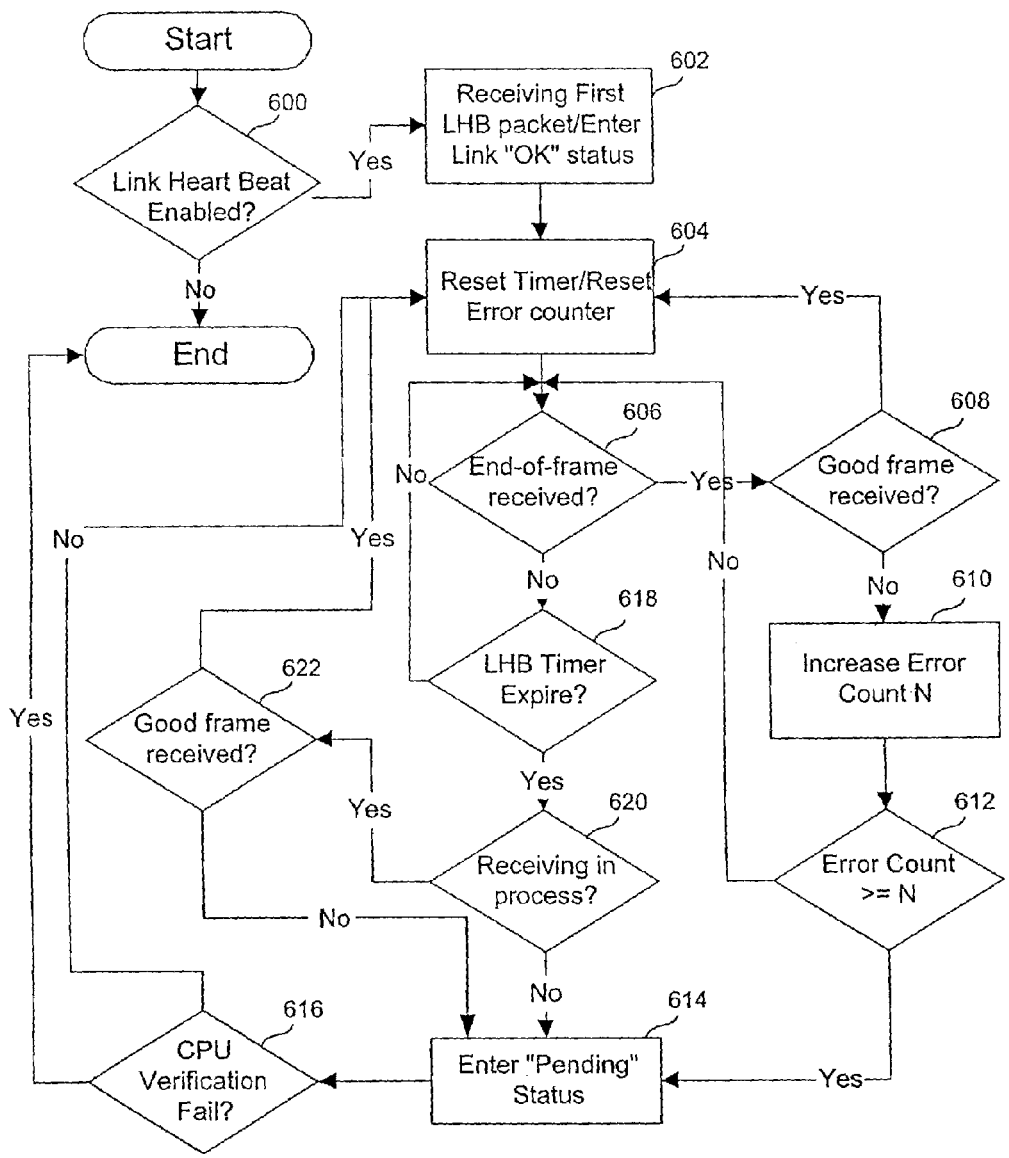
FIG. 6 illustrates a state diagram of the heartbeat signal from the receiving side.

Referring now to FIG. 6, there is illustrated a state diagram of the heartbeat signal from the receiving side. To initiate a MAC module, power is applied, at which time all ports are reset and the status changes to LINK READY. The CPU enables the Heartbeat feature, and the MAC starts sending the MAC LHB signal. The MAC waits for the receiver to send its first LHB signal showing the equivalent capability from remote device, and then changes the status to LINK OK. Switched traffic is then forwarded. On the receiving side, a MAC link detection module monitors the arriving packets. If a good packet arrives within a predefined window time from the last receiving frame (which time window is denoted LINK_FAIL), then the link is in the working mode. The value of the LINK_FAIL time window is configurable, and usually set to approximately twice the transmission period of the LHB message. A good packet indicates that a good data frame or control frame including a MAC heartbeat message has been communicated. Note that the MAC LHB signal is absorbed at the MAC module and cannot be forwarded to the CPU or other ports. Once the MAC does not detect a frame within the LINK_FAIL window, it will enter the LINK PENDING status and send a HEARTBEAT LOST message to the CPU. When the MAC receives N consecutive bad frames, it also enters the LINK PENDING status. In the LINK PENDING status, the MAC module stops transmitting switched traffic. However, the CPU packet and the LHB packet will be continuously transmitted in this state. The CPU may verify the final link status by trying to communicate with the remote device. If the connection cannot be resumed, this port enters LINK Failure status.

Flow begins at a decision block 600 to determine of the LHB has been enabled. If not, flow is out the "N" path to an End terminal. Otherwise, flow is out the "Y" path to a function block 602 to receive the first LHB packet. The link status is then set to "OK".

Flow is to a function block 604 to reset both the timer and error counter. In a decision block 606, the system determines if an end-of-frame has been received. If so, flow is out the "Y" path to a decision block 608 to determine if the received frame was a good frame. If so, flow is out the "Y" path to the function block 604 to reset both the timer and counter in preparation for the next packet (or frame). If the received frame was not good, flow is out the "N" path of decision block 608 to a function block 610 to increase the error count. Flow is then to a decision block 612 to determine the magnitude check on the error count. If the error count is not greater than or equal to a predetermined value N, flow is out the "N" path to the input of decision block 606 to determine if the next end-of-frame has been received. If the error count of the error counter is greater than or equal to a predetermined value N, flow is out the "Y" path to a function block 614 to change the status to "Pending". Flow is then to a decision block 616 to determine if CPU verification has failed. If so, flow is out the "Y" to the End terminal. If CPU verification has not failed, flow is out the "N" path to the function block 604 to reset both the timer and error counter.

If an end-of-frame has not been received, flow is out the "N" path of decision block 606 to a decision block 618 to determine of the LHB timer has expired. If not, flow is out the "N" path to the input of decision block 606. If the LHB timer has expired, flow is out the "Y" path of decision block 618 to a decision block 620 to determine if packet receiving is in process. If not, flow is to the function block 614 to change the status to "Pending" and to the decision block 616 to determine if the CPU verification has failed. If packet receiving is in process, flow is out the "Y" path of decision block 620 to a decision block 622 to determine if a good frame (or packet) was received. If so, flow is out the "Y" path to the function block 604 to reset both the LHB timer and the error counter. If a good packet was not received, flow is to the function block 614 to change the status to "Pending" and to the decision block 616 to determine if the CPU verification has failed.

In addition to the aforementioned link failure detection schemes based on MAC heartbeat messages as described hereinabove, there is described hereinbelow another scheme to actively detect the failure of a connection This scheme makes use of a common setting wherein when a packet is received with identical source and destination MAC addresses, the packet is bounced to its receiving board. A node board can utilize this feature to detect the connection failure.

The process used by this scheme is exemplified as follows. The traffic distribution controller on the node board has to monitor the receiving activities of all access ports. An idle timer will be reset and started every time a good end of packet has been received. If the controller does not receive a good packet prior to the idle timer expiring, the controller will send a special formatted probing packet to the switch fabric board probing the link integrity. Using the bouncing feature mentioned previously, the switch fabric board should send the packet back to the node board. A timer is started after the probing packet is sent. If the probing packet, or any other good packet, is received before the timer expires, the connection is deemed to be working and the idle timer is restarted. However, if the timer expires, then the link will enter a failover state. The waiting period for the bounced packet can be very short since the receiving side is currently silent, meaning the output queue on the switch fabric board is empty. The waiting time should only consist of transmission and switching latency.

The insertion of the special probe packet is not limited to any particular layer of the traffic distribution controller. The probe packet can be inside the MAC module, or in the distribution module on top of the MAC. Moreover, the probe packet can utilize the various packet formats based on which module will bounce back the probe packet. Some possible packet formats include, but are not limited to:

1) Use the format of the PAUSE FRAME (as described in U.S. application Ser. No. 0/284,856 filed Oct. 31, 2002 from which this application claims priority and hereby incorporated by reference). The MAC module can bounce this type of probe packet.

2) Make the Source MAC address equal to the destination MAC address as has been described herein supra.

3) Utilize the general control MAC format where the Destination MAC address is in the range from 01-80-C2-00-00-00 to 01-80-C2-00-00-FF. It should be noted that the MAC address of the aforementioned PAUSE FRAME address 01-80-C2-00-00-01, a special case of this format. Most of the Control MAC packets are forwarded to the CPU, therefore, the CPU can bounce this kind of packet, except for the PAUSE FRAME packet which is processed at the MAC module.

4) Send out the probe packet with a pre-defined destination MAC address. At the receiving side, the system can be set the pre-defined MAC address in the MAC address table to associate to the CPU port. Hence, the CPU can bounce the probe packet back to the source port. It is possible that the traffic distribution controller 208 can bounce the probe packet by setting the MAC address table such that this pre-defined destination MAC address is associated to the same source port.

The idle expiration time is the main factor affecting performance. In order to quickly detect actual link failures, the idle period before sending the probe packet should be as short as possible. However, by setting a short idle period, this will increase the number of probing packets sent on the transmission side, regardless of the volume of traffic flow. Thus, to minimize transmission overhead, the timer should be set for as long a period as possible.

The implementation of this link failure detection scheme can also be reversed. In another embodiment, the switch fabric board may send the probe packets and the node boards would then handle packet bouncing. In yet another embodiment, the implementation may be symmetric wherein both sides can probe the link. However, a symmetric implementation would increase transmission overhead, especially when compared to the link heartbeat method described hereinabove.

The benefit of this scheme is that no additional hardware is required on the side not using this scheme. Only one side needs the embedded module for creating the message, and the other side does not require special hardware to detect this message. Instead the other side just bounces the message to its receiving port by the regular path without any special MAC module to help. For example if the node board uses this scheme, no modification to the switch fabric boards is required.

Figure 7:
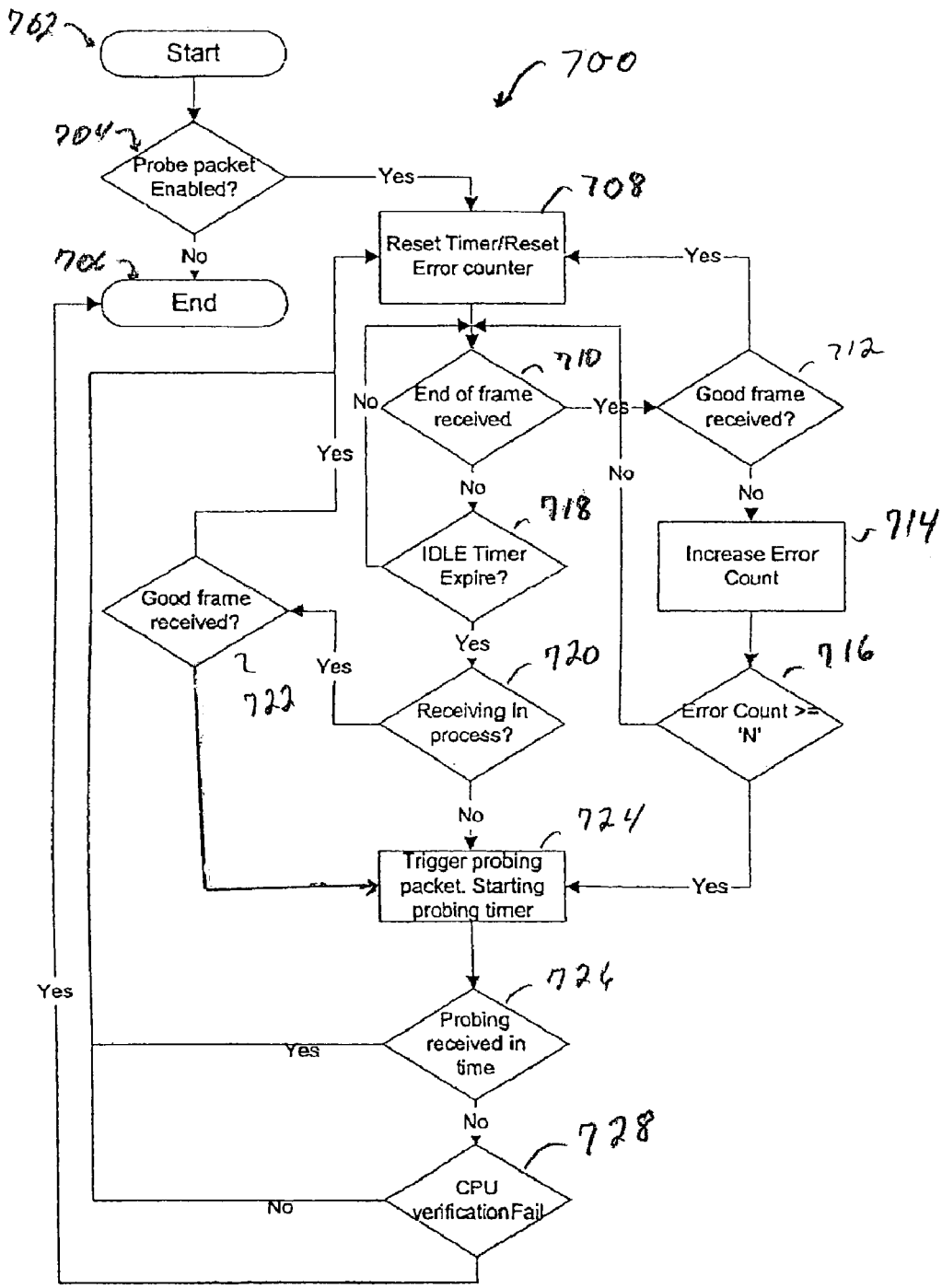
FIG. 7 illustrates a state diagram of the probe packet at the sending side.

Referring now to FIG. 7, a method 700 that is contemplated by the probe packet scheme. It should be noted that as shown in FIG. 7, the method 700 utilizes both an idle timer and an error counter as discussed hereinabove. As those skilled in the art can readily appreciate, the method of the present invention may be used with either the idle timer or error counter separately, or in combination as shown in FIG. 7.

The process begins at step 702. At step 704 it is determined whether probe packet is enabled, that is whether the system can properly handle a probe packet. If not, then as shown at step 706 the process aborts.

If at step 704 it is determined that probe packet is enabled, then as shown at step 708 the idle timer and error counter is reset. Next at step 710 it is determined whether the end of a frame has been received. If the an end of frame is received, then processing proceeds to step 712 where it is determined whether a good frame was received. If at step 712 a good frame was received, then the idle timer and error counter are reset.

However, if at step 712 a bad frame was received, then processing continues at step 714 wherein the error count is increased. Then at step 716 the error count is compared to a threshold value (N). If at step 716 the error count is less than the threshold value, then processing returns to step 710. However, if at step 716 it is determined that the error count is above the threshold value, the processing proceeds to step 724 wherein a probe packet is sent and a probing timer is set.

If at step 710 the end of a frame has not been reached, then processing begins at step 718. If at step 718 it is determined that the idle timer has not expired, then processing returns back to step 710. If at step 718 it is determined that the idle timer expired, then as shown at step 720 it is determined whether receiving is in progress. If a good frame is received, then processing returns to step 708 and the idle timer and reset counter are reset. If at step 720 nothing is being received, or at step 722 it is determined that a bad packet was received after the idle timer expired, then processing goes to step 724, triggering a probe packet and starting a probing timer.

Step 724 may be reached either from step 722 after a bad frame has been received and the idle timer has expired, from step 720 when the idle timer expires and no packet is in the process of being received, or from step 716 wherein the error counter has exceeded a predetermined threshold. After the probe packet has been sent, and the probe timer has been started, at step 726 it is determined whether a response was received for the probe packet within a predetermined time. If a response was received within the allotted time, then processing proceeds from step 726 to step 708 wherein the idle timer and error counter are reset. However, if at step 726 it is determined a response to the probe packet has not been received within the allotted time, processing proceeds to step 728. If at step 728 CPU verification has not failed, then, then processing returns to step 708 wherein the idle timer and error counter are reset, otherwise, the processing ends as indicated by block 706.

Although the preferred embodiment has been described in detail, it should be understood that various changes, substitutions, and alterations can be made therein without departing from the spirit and scope of the invention as defined by the appended claims.

What is claimed is:

1. A backplane system comprising:
   a plurality of node boards;
   a plurality of switch fabric boards;
   wherein each node of the plurality of node boards has a single link to each of the plurality of switch fabric boards wherein at least one selected from the group consisting of the plurality of node boards and the plurality of switch fabric boards further comprises means for setting a timer for a predetermined interval;

means for resetting the timer to the predetermined interval whenever a valid packet is received;

and means for sending a probe packet and setting a probe timer when the timer expires.

2. The backplane system of claim 1 wherein the at least one selected from the group consisting of the plurality of node boards and the plurality of switch fabric boards further comprises means for changing the status of the communication link to a failure mode when the probe timer expires and a valid response to the probe packet has not been received.

3. The backplane system of claim 1, wherein the at least one selected from the group consisting of the plurality of node boards and the plurality of switch fabric boards further comprises means for sending a probe packet and setting a probe timer after a predetermined number of consecutive invalid packets are received.

4. The backplane system of claim 3 wherein the at least one selected from the group consisting of the plurality of node boards and the plurality of switch fabric boards further comprises means for changing the status of the communication link to a failure mode when the probe timer expires and a valid response to the probe packet has not been received.

5. The backplane system of claim 1 wherein each switch fabric board further comprises a redirect table;

and wherein when a switch fabric board detects a failed link, the switch fabric board communicates failed link data to the remaining switch fabric boards, causing the other switch fabric boards to update their redirect tables.

6. The backplane system of claim 1 wherein the probe timer is set for a minimum interval comprising a transmission and switching latency time period.

7. The backplane system of claim 1 wherein the probe packet is inserted in a distribution module on top of a Media Access Controller layer.

* * * * *